(12) United States Patent
Keirse

(10) Patent No.: US 10,426,141 B2
(45) Date of Patent: Oct. 1, 2019

(54) POULTRY FEEDING SYSTEM HAVING WALLS WHICH DELIMIT OR EXTEND THROUGH A FEEDING SPACE AT LEAST PARTLY PROVIDED WITH SHARP-EDGED LINE-ELEVATIONS

(71) Applicant: ROXELL bvba, Maldegem (BE)

(72) Inventor: Philippe Hyppoliet Pia Maria Keirse, Maldegem (BE)

(73) Assignee: ROXELL bvba, Maldegem (BE)

( * ) Notice: Subject to any disclaimer, the term of this patent is extended or adjusted under 35 U.S.C. 154(b) by 197 days.

(21) Appl. No.: 15/308,399

(22) PCT Filed: May 11, 2015

(86) PCT No.: PCT/EP2015/060307
§ 371 (c)(1),
(2) Date: Nov. 2, 2016

(87) PCT Pub. No.: WO2015/173170
PCT Pub. Date: Nov. 19, 2015

(65) Prior Publication Data
US 2017/0055500 A1 Mar. 2, 2017

(30) Foreign Application Priority Data

May 16, 2014 (NL) ........................... 2012824

(51) Int. Cl.
*A01K 39/012* (2006.01)
*A01K 39/01* (2006.01)

(52) U.S. Cl.
CPC .......... *A01K 39/0125* (2013.01); *A01K 39/01* (2013.01); *A01K 39/012* (2013.01)

(58) Field of Classification Search
CPC ... A01K 39/0125; A01K 39/01; A01K 39/012
See application file for complete search history.

(56) References Cited

U.S. PATENT DOCUMENTS

| 3,045,321 A | 7/1962 | McDermott |
| 3,230,933 A | 1/1966 | Myers et al. |
| (Continued) | | |

FOREIGN PATENT DOCUMENTS

| CN | 2092861 U | 1/1992 |
| DE | 202012004008 U1 | 7/2012 |
| (Continued) | | |

OTHER PUBLICATIONS

Glatz, P. et al., "Beak Trimming Handbook for Egg Producers", Section 4.12 Beak abrasives, Csiro Publishing, Australia, 2006.

(Continued)

*Primary Examiner* — Joshua D Huson
(74) *Attorney, Agent, or Firm* — Hoffmann & Baron, LLP

(57) ABSTRACT

A poultry feeding system includes walls which together delimit a feeding space which at its upper side is accessible for poultry via a feeding opening. A feed supply is provided for supplying feed at an inlet position into the feeding space, such that poultry is able to pick feed out of the feeding space. The walls are at least partly provided with an abrasive surface structure that includes a pattern of a plurality of sharp-edged line-elevations for having beaks of the poultry abraded and worn as they pick feed out of the feeding space.

16 Claims, 6 Drawing Sheets

(56) References Cited

U.S. PATENT DOCUMENTS

| | | | |
|---|---|---|---|
| 3,433,205 A | 3/1969 | Pittard | |
| 3,533,310 A | 10/1970 | Kuchenhart et al. | |
| 3,763,826 A * | 10/1973 | Portelli | A01K 5/0114 |
| | | | 119/52.1 |
| 4,005,597 A | 2/1977 | Coon | |
| 4,182,204 A | 1/1980 | Coon | |
| 4,207,838 A | 6/1980 | Pirovano | |
| 4,495,894 A * | 1/1985 | Swartzendruber | B65G 19/165 |
| | | | 119/57.2 |
| 5,235,934 A * | 8/1993 | Runion | A01K 39/0125 |
| | | | 119/464 |
| 8,074,601 B2 * | 12/2011 | Van de Ven | A01K 39/014 |
| | | | 119/52.1 |
| 8,347,816 B2 * | 1/2013 | Keirse | A01K 39/012 |
| | | | 119/52.1 |
| 8,381,683 B2 * | 2/2013 | Keirse | A01K 39/0125 |
| | | | 119/52.4 |
| 8,910,594 B2 * | 12/2014 | Kuking | A01K 31/007 |
| | | | 119/443 |
| 9,572,326 B2 * | 2/2017 | Steudler, Jr. | A01K 39/0125 |
| 10,064,712 B2 * | 9/2018 | Rust | A61D 1/005 |
| 2009/0000555 A1 * | 1/2009 | Keirse | A01K 39/0125 |
| | | | 119/52.1 |
| 2010/0146867 A1 * | 6/2010 | Boden | B24D 3/00 |
| | | | 51/309 |
| 2010/0192863 A1 * | 8/2010 | Van de Ven | A01K 39/0125 |
| | | | 119/52.1 |
| 2011/0094447 A1 * | 4/2011 | Keirse | A01K 39/012 |
| | | | 119/52.1 |
| 2013/0014704 A1 * | 1/2013 | Kuking | A01K 31/007 |
| | | | 119/479 |
| 2013/0139755 A1 * | 6/2013 | Steudler, Jr. | A01K 39/0125 |
| | | | 119/51.01 |

FOREIGN PATENT DOCUMENTS

| | | |
|---|---|---|
| EP | 0 060 009 A1 | 9/1982 |
| EP | 2 849 973 B1 | 8/2017 |
| FR | 2695338 B1 | 6/1996 |
| RU | 2010 110 597 A | 9/2011 |
| WO | WO 2005/086975 A2 | 9/2005 |
| WO | 2009/024845 A1 | 2/2009 |
| WO | WO 2009/024845 A1 | 2/2009 |
| WO | WO 2015/173170 A1 | 11/2015 |

OTHER PUBLICATIONS

Lumb, S., "Blunting laying hen's beaks instead of trimming", World Poultry, vol. 22, No. 6, p. 13, 2006.

* cited by examiner

POULTRY FEEDING SYSTEM HAVING WALLS WHICH DELIMIT OR EXTEND THROUGH A FEEDING SPACE AT LEAST PARTLY PROVIDED WITH SHARP-EDGED LINE-ELEVATIONS

CROSS-REFERENCE TO RELATED APPLICATIONS

This application is the National Stage of International Application No. PCT/EP2015/060307 filed May 11, 2015, which claims the benefit of Netherlands Application No. NL 2012824, filed May 16, 2014, the contents of which is incorporated by reference herein.

FIELD OF THE INVENTION

The invention relates to a poultry feeding system of the type having walls which together delimit or extend through a feeding space which at its upper side is accessible for poultry to pick feed out of the feeding space. In particular the invention relates to a poultry trough feeding system of the type having a feeding track extending through a poultry stable, which track comprises one or more horizontal longitudinal trough segments, or to a poultry pan feeding system of the type having one or more feeding devices placed in a poultry stable, which devices comprise dish-shaped dispensing pans.

BACKGROUND OF THE INVENTION

A trough feeding system for poultry is for example known from U.S. Pat. No. 3,433,205 and comprises an endless feeding track meandering through a poultry stable. The track is built up out of a number of upwardly open feeding-trough segments. At their ends the segments are connected with each other by means of bend sections or corner wheels. Together the segments and the bend sections form a continuous track. The feeding-trough segments at their upper sides are each provided with a longitudinal slit-shaped feeding opening. Feed is supplied to the track out of a hopper, silo or the like. The feed is distributed over the entire track by means of pulling an endless conveying element through the track, which conveying element here is formed by an endless chain. Links of the chain are slideably supported by a bottom wall of the trough segments. The poultry is then able to pick feed out of the feeding-trough segments while standing on the floor of the stable next to one another along the feeding-trough segments.

A disadvantage herewith is that beaks of the poultry keep on growing. For some animals this may lead to difficulties during feeding. It may even make it impossible for them to quickly and easily pick feed out of the trough segments. This can for example be caused by the upper beak half growing over and passed by the lower beak half. Another disadvantage is that the growing beaks may become rather sharply pointed. On the one hand this may lead to injuries to the poultry when they start picking each other, better known as cannibalism. This leads to deteriorated feed efficiency and hen feathering during production, as well as increased mortality. On the other hand it may lead to damages to the feeding-trough segments and other parts of the feeding system inside the stable, caused by the poultry picking through them.

In addition it is noted that a continually decreasing number of countries permit beak cauterization or trimming of commercial poultry. This prohibition is introduced in connection with animal welfare. Consequently the poultry's beaks may remain razor-sharp throughout their life cycle.

Another example of a trough feeding system for poultry is known from U.S. Pat. No. 4,207,838. This system also comprises a continuous track which is formed by a number of trough segments. The endless conveying element here is formed by an endless cable with interspaced discs connected thereto. The trough segments here can be made out of metal or plastics material.

When made out of metal, it is less likely that the poultry is able to pick through the trough segments. However here also the disadvantage remains that the poultry still may have difficulties during feeding caused by malformed grown beaks, and may cause injuries to each other and to other parts of the feeding system inside the stable.

It is already known from U.S. Pat. No. 5,235,934 to have the poultry's beaks automatically get abraded and trimmed as they feed. Here it is shown to provide an abrasive surface structure on walls that delimit a feeding space inside a dispensing pan of a poultry pan feeding system. The abrasive surface is obtained by bonding small abrasive particles directly to those walls. In a variant these adhesive particles are bonded to a carrier, such as film, which is in turn adhered to the walls that delimit the feeding space inside the pan.

One drawback of this is that the adhering of the abrasive particles to the pan is difficult, since the pan is usually manufactured from polypropylene, a type of plastic that is non-glueable. A further drawback is that the granular structure of the abrasive particles varies substantially, leading to different rates at which the beaks abrade. In addition, there is a risk that some of the abrasive particles may become loose, as a result of which they may enter the feed and, consequently, the birds' stomachs. This will then, in particular, occur during a feed-restriction period in which the birds often peck in the feeder pans. The local loss of the abrasive particles will immediately result in a slower rate at which the abrading and trimming takes place. Furthermore it may lead to weak points that are susceptible to wear, and the pan may even be perforated by the birds' beaks at these points.

SUMMARY OF THE INVENTION

The present invention aims to at least partly overcome one or more of the abovementioned disadvantages and/or to provide a usable alternative. In particular the invention aims to provide an animal-friendly and cost-effective automated poultry feeding system with which feed can be supplied to poultry in a hygienic manner without problems with injuries or damages caused by sharp-pointed beaks occurring.

This aim is achieved by a poultry feeding system according to the present invention. The system comprises walls which together delimit a feeding space or that extend through the feeding space. At its upper side the feeding space is accessible for poultry via a feeding opening. A feed supply is provided for supplying feed at an inlet position into the feeding space. The walls which together delimit or extend through the feeding space have at least partly been provided with an abrasive surface structure. The abrasive surface structure comprises a pattern of a plurality of sharp-edged line-elevations that together are designed for having beaks of the poultry abraded and worn in an animal friendly way as they pick feed out of the feeding space. With the sharp-edged line-elevations it is meant that a relief is formed that comprises a plurality of sharp-edged longitudinal ridges that may be curvilinear or straight. The pattern of the plurality of sharp-edged line-elevations acts as a file: it files the beak's sharp translucent top end (the horn) in a gentle way as the birds are pecking the feed. On the other hand the pattern of the plurality of sharp-edged line-elevations is gentle towards trimmed beaks in order to prevent any wounds or discomfort to the birds. The sharp-edged line-elevations can be provided in a very regular pattern that does not wear out easily, and that does not comprise any particles that may get loose during picking. This makes it possible to guarantee a very constant rate of abrading for the poultries beaks over long periods of time, which makes the system very reliable and animal-friendly.

Owing to the invention the poultry automatically get their growing beaks abraded and worn each time they pick feed particles out of the feeding space and with this get to move with their beaks over the pattern of the plurality of sharp-edged line-elevations that is provided on the walls which together delimit or extend through the feeding space. This causes their beaks to each time slightly get chafed and thus wear off. Thus it is advantageously obtained that the beaks owing to natural picking behaviour of the animals themselves remain relative blunt instead of getting to grow as sharp as razor blades. Also it is advantageously obtained that upper and lower halves of the beaks remain to neatly fit to each other instead of getting to grow malformed such that the animals become unable to quickly and properly pick feed. Furthermore it is advantageously obtained that the poultry is unable to severely injure each other and/or to severely damage critical components of the feeding system by means of picking. All in all this makes the system much more animal-friendly. Stress for the poultry population is reduced, since beak cauterization or trimming is no longer necessary and since they are unable to injure each other by picking. For the farmer a cost and time reduction can be obtained, because it is no longer necessary to cauterize or trim the animals, and since damages to the system are further minimized. Finally the profits for the farmer can be increased because of the poultry getting healthier and less stressed, resulting in a better feed efficiency and less mortality.

The curvilinear or straight line-elevations preferably extend in plural directions over the surface of the walls which delimit or extend through the feeding space. In this way it hardly makes a difference in which direction the poultry move with their beaks relative to the elevations during picking.

By varying certain parameters of the abrasive pattern of sharp-edged line-elevations, like the amount and sharpness of sharp edges thereof, it can be obtained to have the poultry's beaks abraded and worn in an extent which is just right for them. Not too much abrasion and wear because this would otherwise lead to injuries to their beaks themselves, and not too little because this would mean that the above-mentioned disadvantages of the state of the art would still not be overcome.

The line-elevations can be made in various manners. For example they can be machined or etched. Also they can be obtained by means of a stamping or punching operation into a plate-shaped material.

In a preferred embodiment the elevations may, seen from above, form circumferentially closed sharp-edged line-elevations, like circles, ovals, rectangulars, etc. The circumferentially closed sharp-edged patterns can be placed in a regular arrangement, like a matrix. The circumferentially closed sharp-edged patterns offer the advantage that they are able to accumulate some feed particles within them, such that the animals are attracted to try to pick out those feed particles and with that frequently get to strike with their beaks along the circumferentially closed sharp-edged patterns.

In a further embodiment each circumferentially closed sharp-edged line-elevation may form part of a crater. Such a crater then for example may comprise an outwardly pressed elevation, preferably an outwardly pressed substantially circular elevation, and with an inwardly pressed recess therein, preferably a fully rounded recess, like a substantially semi-spherical or a substantially cone-shaped recess. The sharp-edged line-elevation then can be provided on the transition between the elevation and the recess. The craters have the advantage that they can economically be made by a two-step stamping or punching operation in two opposing directions with a stamping or punching tool and a counter die. Furthermore they bring the advantage that the recess itself can be given a smooth surface, which is easily cleanable. This helps to make it possible for the animals to continuously pick clean the pattern of the plurality of sharp-edged line-elevations. In this way focus of infection, like the growing of mold and the like, can be prevented.

The pattern of the plurality of sharp-edged line-elevations may form an integral part of the walls or insert members of those walls which together delimit the feeding space or that extend through the feeding space. This makes the feeding system including the pattern of the plurality of sharp-edged line-elevations robust.

In the alternative the pattern of the plurality of sharp-edged line-elevations may also be provided on one or more members which are releasably connected to the walls which together delimit the feeding space or that extend through the feeding space. This makes it possible to flexibly change members with patterns of the plurality of sharp-edged line-elevations of one type for ones of another type such that intensity and amount of abrading and trimming can be made complementary to the type of feeding, for example continuous or restricted feeding, and/or complementary to the type and age of the poultry.

The pattern of the plurality of sharp-edged line-elevations can be made out of all kinds of materials, like wear-resistant or reinforced plastic. Preferably it is made out of metal, such that it is optimally resistant to the impacts of the beaks of the picking poultry, remains hygienic, and is able to maintain sufficiently abrasive over time.

In a first preferred embodiment the system may be a poultry trough feeding system of the type having a feeding track extending through a poultry stable, which track comprises one or more horizontal longitudinal trough segments. The trough segment has inner walls which together delimit the feeding space. At its upper side the trough segment is open making the feeding space inside the trough segment accessible for the poultry. A feed supply is provided for supplying feed at an inlet position into the feeding track. A drivable conveying element extends along the feeding track for transporting feed from the inlet position along the feeding space inside the trough segment. According to the inventive thought, one or both of the conveying element and inner trough segment walls then may have at least partly been provided with the pattern of the plurality of sharp-edged line-elevations.

The conveying element may comprises a chain with links which are slideably carried by a bottom wall of the trough segment. Upper sides of the chain links then can be at least partly provided with the pattern of the plurality of sharp-edged line-elevations. Since the chain links slide over the bottom wall and thus delimit a lower side of the feeding space inside the trough segment, the animals are prone to frequently get into contact with the chain links during picking and thus to automatically get their beaks abraded and worn.

In a variant or in addition thereto the inner trough segment walls may comprise sloping wall sections which lead towards the conveying element. The sloping wall sections then may at least partly be provided with the pattern of the plurality of sharp-edged line-elevations. The sloping wall sections are likely to get feed particles distributed over them during feeding, which feed particles then advantageously may remain lying there because of the pattern of the plurality of sharp-edged line-elevations stopping them from immediately sliding all the way down towards the bottom of the trough segment. Not only may the feed particles get distributed over the sloping walls directly by the conveyor element, it is also possible that the feed particles get distributed over the sloping walls by selective picking behaviour of the animals during which they may throw less desired feed particles sideways.

In a second preferred embodiment the system may be a poultry pan feeding system of the type having a feeding device hanging or standing in a poultry stable, which device comprises at least one dish-shaped dispensing pan. The dish-shaped dispensing pan has inner walls which together delimit the feeding space. At its upper side the pan is open, making the feeding space inside the pan accessible for the poultry. A feed drop tube is provided that opens out above a central part of the pan. According to the inventive thought, the inner walls of the dispensing pan have at least partly been provided with the pattern of sharp-edged line-elevations.

Further preferred embodiments are described herein.

The invention also relates to a method for feeding poultry.

BRIEF DESCRIPTION OF THE DRAWINGS

The invention shall be explained in more detail below with reference to the accompanying drawings, in which:

FIG. 2a shows an enlarged cross-sectional view of an embodiment of the craters in FIG. 2;

DETAILED DESCRIPTION OF THE INVENTION

Figure 1:
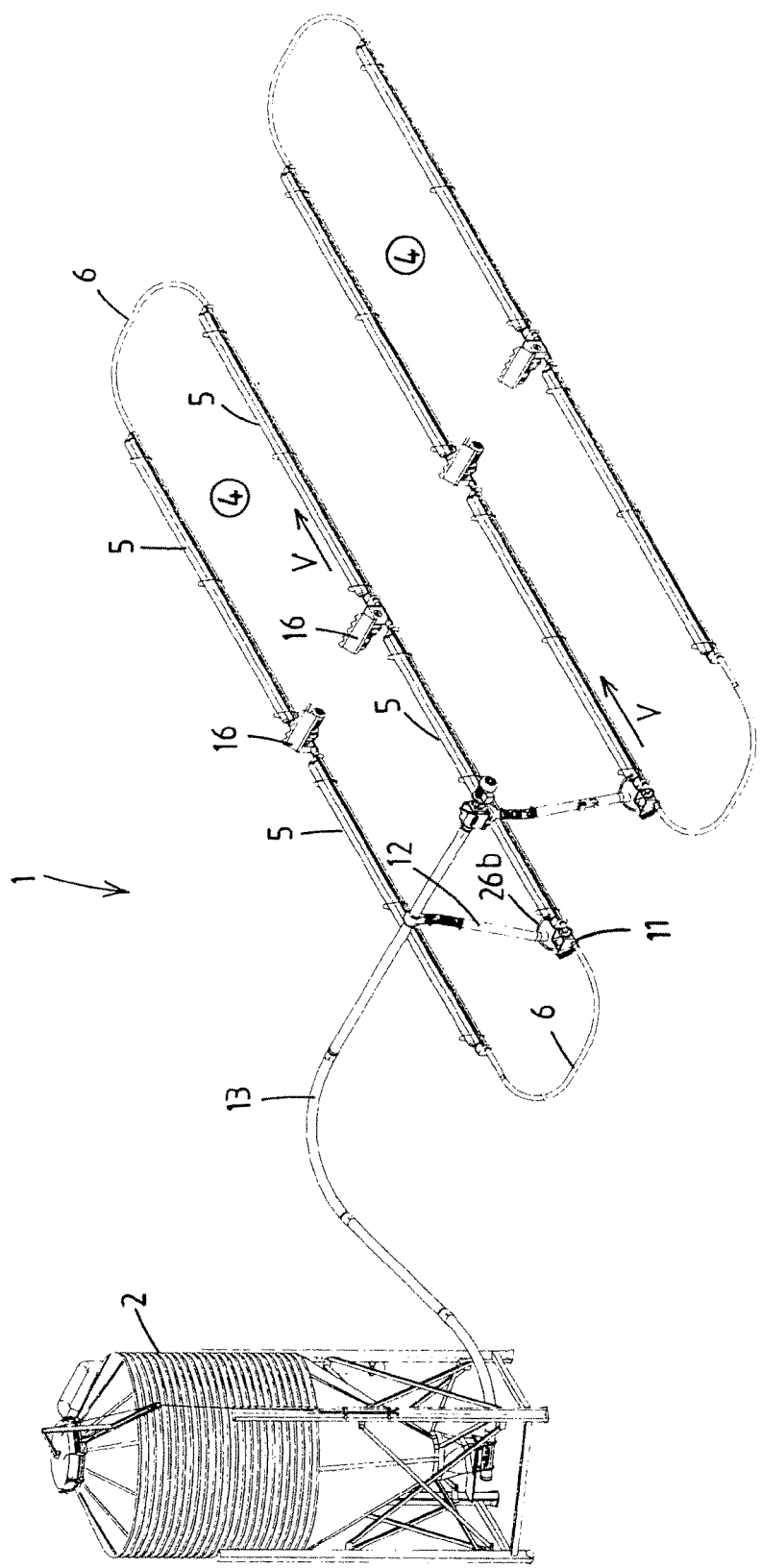
FIG. 1 is a schematic overview of an embodiment of a trough feeding system according to the invention having two endless tracks of the auger feeder type.

The poultry trough feeding system in its entirety is given the reference numeral 1 in FIG. 1. The system 1 comprises a dry feed silo 2, as well as two endless feeding tracks 4. Each feeding track 4 comprises four substantially straight trough segments 5 and two bend sections 6. Two of those trough segments 5 lie in line and together have a length of more than 15 meter, in particular more than 30 meter, such that they preferably are able to extend over the width or length of an average poultry stable floor. The bend sections 6 are formed by semi-circular circumferentially closed pipe sections.

Figure 2:
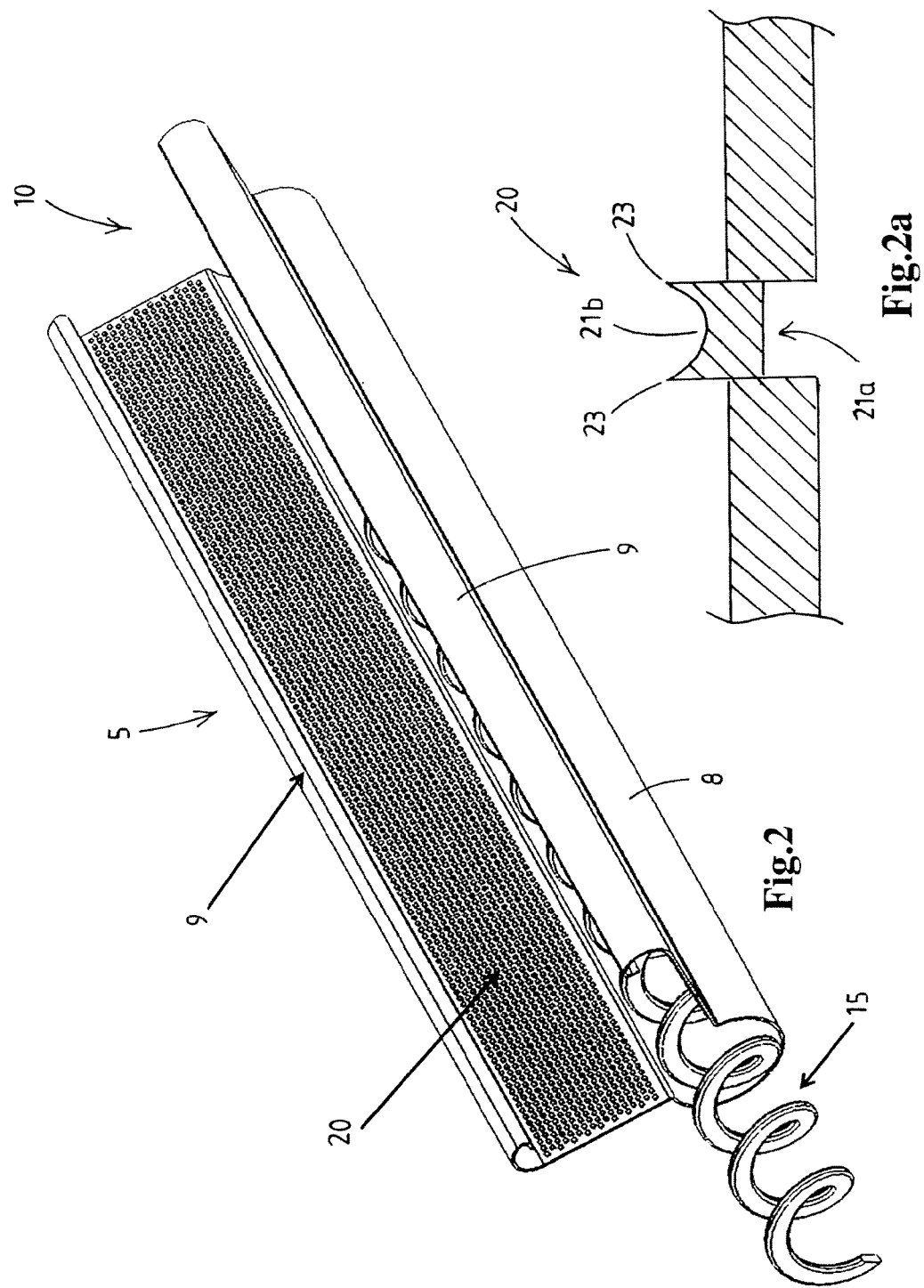
FIG. 2 is a schematic perspective view of part of an embodiment of a trough segment of FIG. 1.

As can be seen in FIG. 2, each trough segment 5 has an elongate shape and comprises a rounded (seen in cross section) pipe section 8 which at its upper side over its entire length has a slit-shaped opening. Two sloping side walls 9 adjoin the slit-shaped pipe opening. The pipe section 8 and the two side walls 9 connecting thereto together delimit a feeding space with a feeding opening 10 at its upper side.

Near one of the outer ends of one of the bend sections 6, a dry feed supply 11 is connected at an inlet position to the track 4. This supply comprises a so-called intake boot provided at the lower end of a drop tube 12. The intake boot can be fed with dry feed via the drop tube 12 which in turn can be fed with dry feed via a transportation duct 13 connecting to the silo 2.

An endless conveying element formed by an endless open helical spring 15 extends in a longitudinal direction through each entire feeding track 4, including its trough segments 5, bend sections 6 and intake boot 11. The helical spring 15 is formed by a suitably bent (rectangular) wire which is moveable in the longitudinal direction through the feeding track 4 by means of two drive units 16. See also EP-0 060 009. The drive units 16, which here are formed by electro-motors, each are able to drive a sprocket wheel of which the teeth penetrate between windings of the spring 15. During driving the teeth push and pull the spring forward in a direction v through the track 4.

The helical spring is able to substantially evenly distribute the feed from out of the supply 11 over each and every one of the trough segments 5. Poultry is then able to take standing positions next to the trough segments 5 and start picking feed out of there.

According to the invention the sloping side walls 9 at their inner sides which lie at the side of the feeding space and which are directed towards the feeding opening 10, are provided with an abrasive surface structure 20. The structure 20 here is formed by a large number of interspaced craters 21, one of which is shown in enlarged cross-sectional view in FIG. 2a. Here it can be seen that each crater 21 comprises an outwardly pressed substantially circular elevation 21a, into which a substantially semi-spherical recess 21b has been inwardly pressed. Because of this a circumferentially closed circular sharp-edged line-elevation 23 is formed. The crater 21 here as it were has been upwardly formed out of a plate-shaped material.

The circular sharp-edged line-elevations 23 of all the craters 21 together form an abrasive pattern that causes the beaks of the poultry to automatically wear off a little bit each time they get into contact therewith. The semi-spherical recesses 21b offer the advantage that they are able to accumulate some feed particles therein, such that the animals are attracted to try to pick out those feed particles and with that get to strike with their beaks along the sharp-edged line-elevations 23.

Preferably the walls are made out of metal such that the craters 21 can form an integral part of the walls 9 by being stamped therein. It is however also possible to make the walls out of a wear-resistant plastic and mould the craters 21 directly along with the moulding of the walls 9 themselves.

Figure 3:
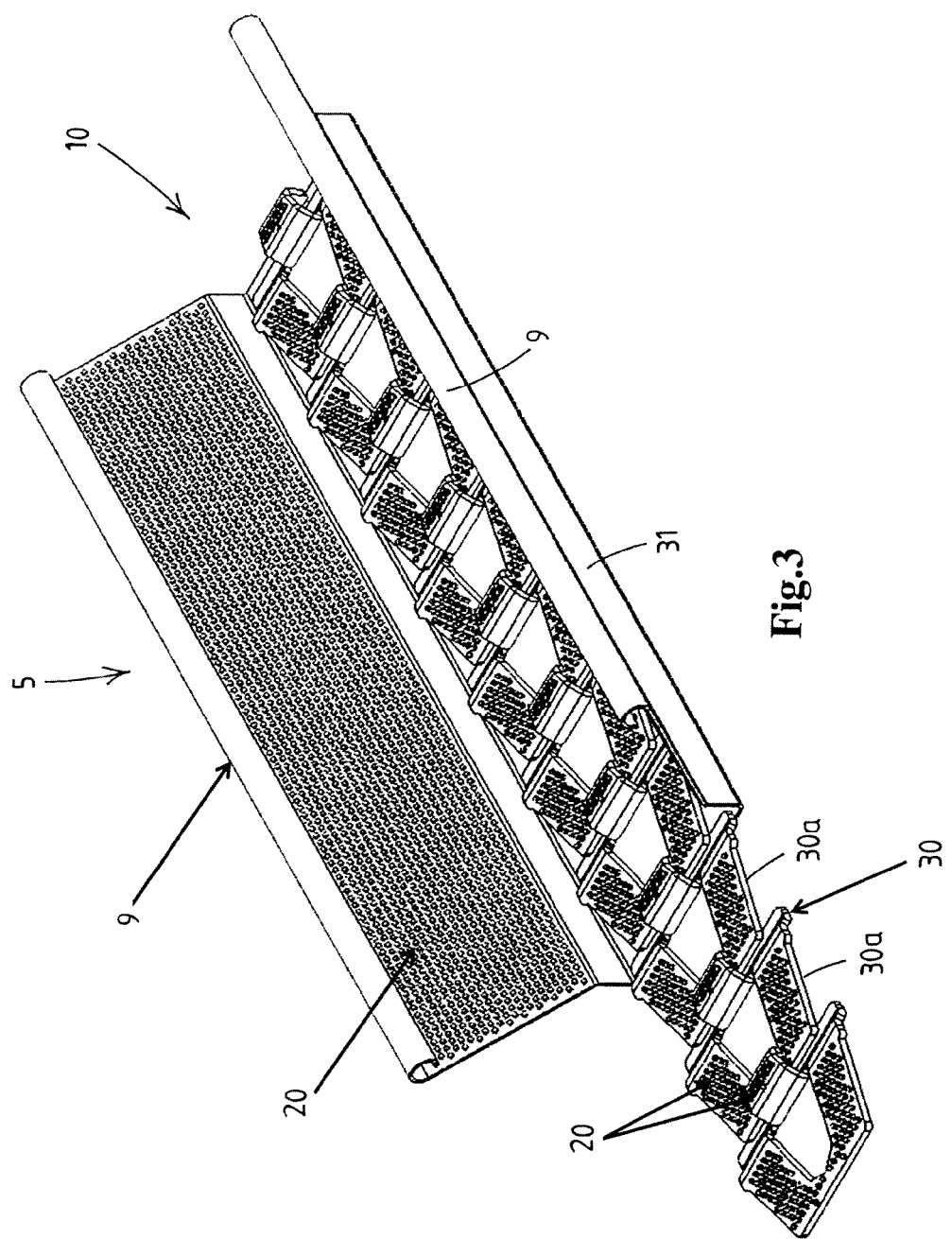
FIG. 3 is a view similar to FIG. 2 showing a trough segment of a variant trough feeding system according to the invention of the chain feeder type.

In FIG. 3 a variant is shown in which the endless conveying element is formed by a chain 30 which comprises a plurality of links 30a. Each trough segment 5 now is formed by an angled (seen in cross section) gutter section 31. The two sloping side walls 9 adjoin the gutter section 31. This time not only the sloping side walls 9 are provided with the abrasive surface structure 20, but also the chain links 30a. This helps to further abrade and trim poultry's beaks during picking of feed out of the feeding space.

Figure 4:
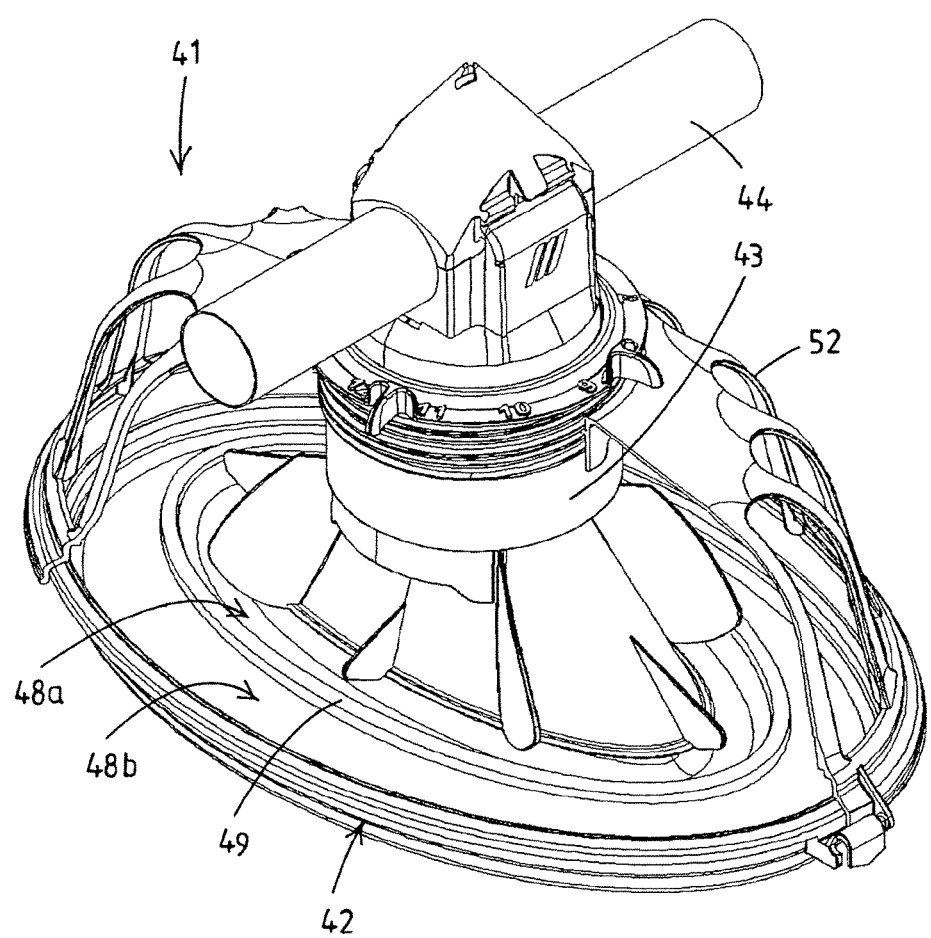
FIG. 4 is a schematic perspective view of part of a pan feeding system.

In FIG. 4 a feeding device 41 comprises a dispensing pan 42 surmounted by a substantially vertically-oriented drop tube 43. The proximal end of the drop tube 43 is connected to a discharge opening of a feed transport pipe 44. The distal section of the drop tube 43 will usually be flared and located above the central part of the dispensing pan 42. The drop tube 43 works in conjunction with the raised mid-section 47 of the dispensing pan 42 (see FIG. 5). In particular, an opening is created between the drop tube 43 and the raised mid-section 47 that enables feed to move to the bottom area of the dispensing pan 42. The drop tube 43 is adjustable, so that feed can be offered at various heights in the dispensing pan 42. The raised mid-section 47 joins to a base plate 48 which is shown here with an inner trough 48a and an outer trough 48b. The troughs 48a, 48b are separated from each other by a raised section of the base plate 48. The inner trough 48a is also referred to here as the feeding space pecking area, by which it is meant the zone of the base plate 48 where the animals are accustomed to finding feed that has been supplied via the drop tube 43. The outer circumference of the base plate 48 is formed into a raised and outwardly tapered sidewall 50. A grid 52 is connected to the top rim of the side wall 50 of the dispensing pan 42 by a clip. The dispensing pan 42 is suspended from the feed transport pipe 44 via the grid 52 and the drop tube 43. The dispensing pan 2 is largely manufactured from a plastic base material, for example polypropylene.

The base plate 48 of the dispensing pan 42, at the location of the trough 48a, comprises a preformed metal insert member against the outer edges and/or bottom side of which the plastic base material has been injection-moulded, such that a strong bond between them is obtained whereas an upper side of the metal insert member remains substantially free of the plastic base material. See also WO 2009/024845. The metal insert member thus forms a wall that delimits the feeding space.

Figure 5:
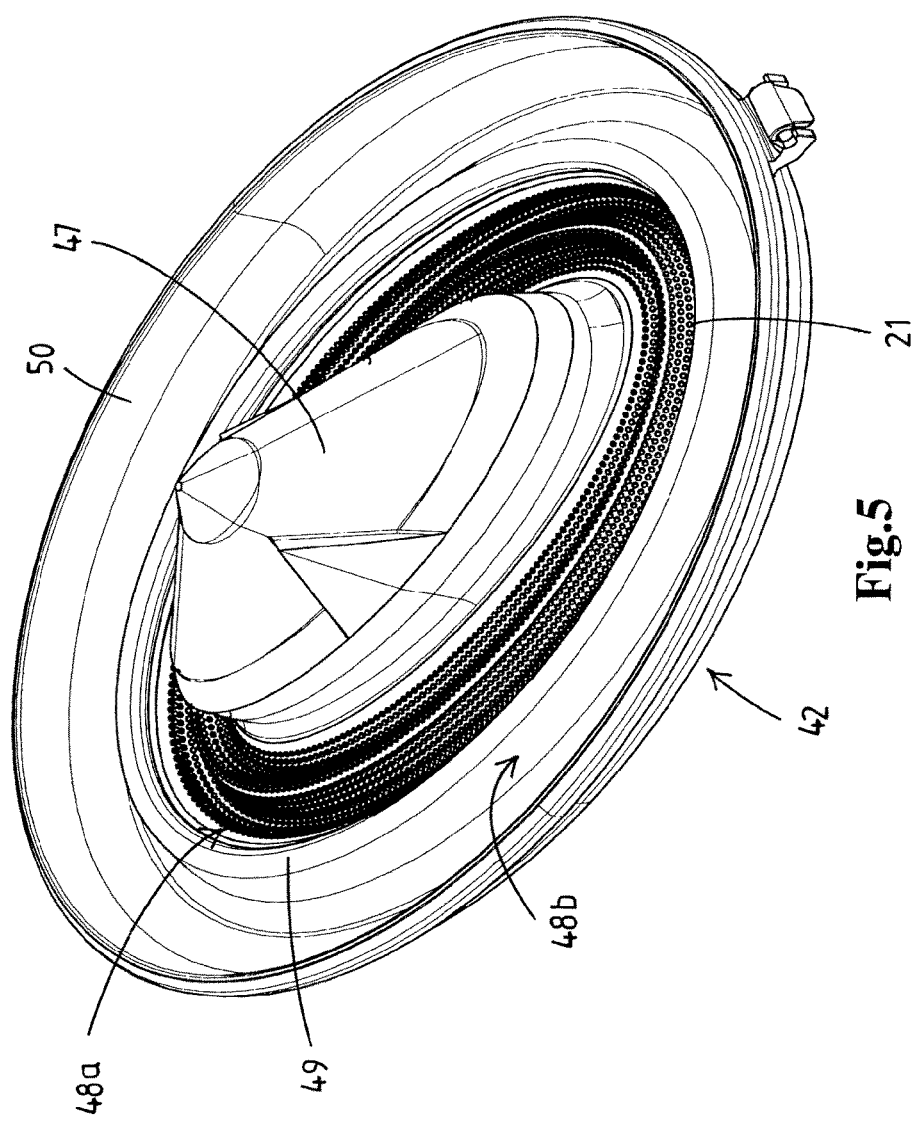
FIG. 5 is a schematic perspective view of a dispensing pan of FIG. 4 equipped with the abrasive pattern according to the invention.

In FIG. 5 it is shown that the metal insert member in accordance with the present invention has been provided with the sharp-edged craters 21. Thus, for this type of pan feeding system it is also obtained that the sharp-edged line-elevations of all the craters 21 together form an abrasive pattern that causes the beaks of the poultry to automatically wear off a little bit each time they pick feed out of the trough 48a.

Figure 6:
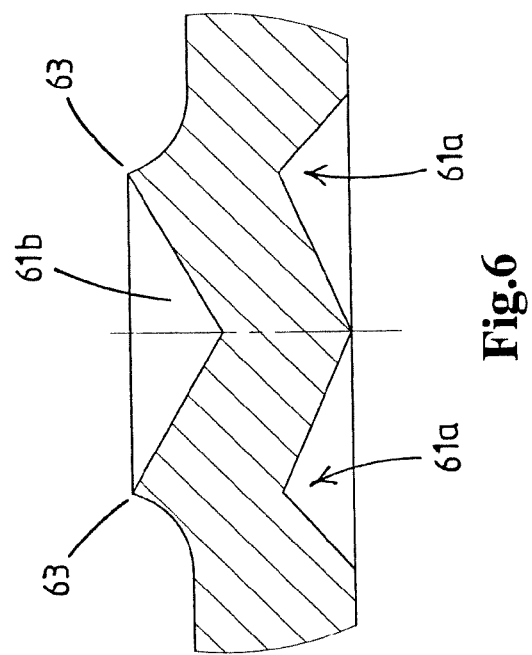
FIG. 6 shows an enlarged cross-sectional view of an alternative embodiment for the craters as shown in FIGS. 2, 3 and 5.

In FIG. 6 an alternative embodiment has been shown for the craters. Here each crater comprises an outwardly pressed substantially ring-shaped elevation 61 a, into which a substantially cone-shaped recess 61b has been inwardly pressed. Because of this a circumferentially closed sharp-edged line-elevation 63 is formed.

Figure 7:
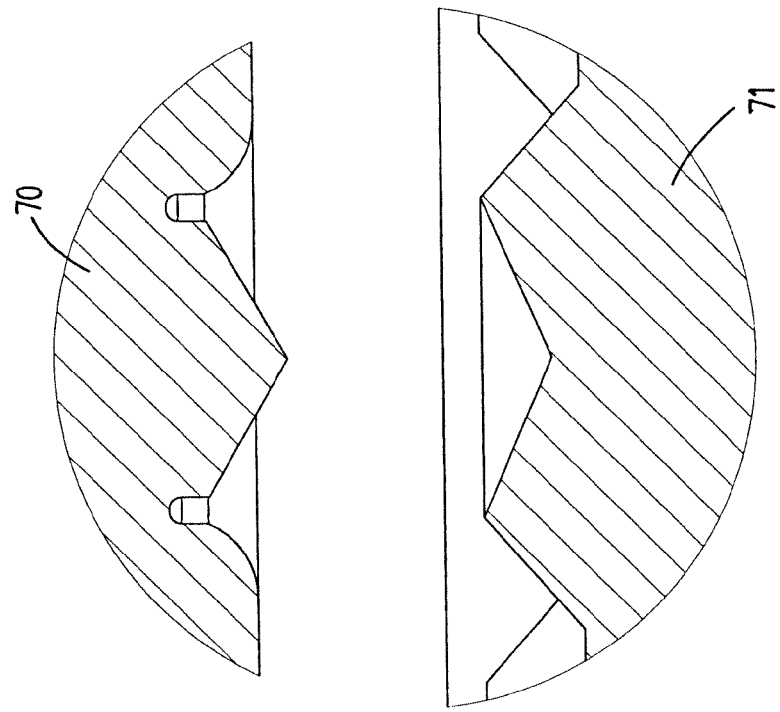
FIG. 7 shows an enlarged cross-sectional view of a stamping tool and a counter die for manufacturing the crater of FIG. 6.

A pattern of such craters can advantageously be obtained by means of one common stamping operation. For this a stamping tool 70 and a counter die 71 that are partly shown in FIG. 7 can be used. By placing a plate-shaped metal member in between the stamping tool 70 and the counter die 71, and then pressing them forcedly towards each other, a plurality of the craters gets automatically pressed into the plate-shaped metal member. Subsequently the plate-shaped metal member can be further preformed in its entirety into a desired shape, for example one that corresponds to the shape of the trough 48a, or other wall part that is destined to delimit or extend through a feeding space of a poultry feeding system.

Besides the embodiments shown, numerous variants are possible. For example the shapes and dimensions of the various parts can be varied. Instead of craters, or other kinds of sharp-edged curvilinear line-elevations it is also possible to use other types of sharp-edged line-elevations, for example a screen or raster of sharp-edged straight line-elevations, which together form a sort of file. It is also possible to also provide other wall parts of the trough segments, like the bottom wall thereof, or other wall parts of the dispensing pan, like the outer trough thereof, with the abrasive surface structure of sharp-edged line-elevations. This may help to strengthen those other wall parts and may also assist the abrading and trimming during feeding. Instead of using the abrasive surface structure of sharp-edged line-elevations in combination with an endless track, it is also possible to use the abrasive surface structure of sharp-edged line-elevations for finite types of trough feeding systems, like for example ones with elongate gutters having a finite rotatable transportation screw extending therein. Instead of using the abrasive surface structure of sharp-edged line-elevations in combination with an oval shaped dispensing pan, it is also possible to use the abrasive surface structure of sharp-edged line-elevations for other types of poultry dispensing pans.

Thus the invention provides for an animal-friendly, hygienic poultry feeding system with a pecking area that has an advantageous abrasive surface structure of sharp-edged line-elevations added thereto such that a frequent pecking by birds automatically results in their beaks getting abraded and worn in a reliable manner.

The invention claimed is:

1. A poultry feeding system, comprising:
   walls which together delimit a feeding space which at its upper side is accessible for poultry; and
   a feed supply for supplying feed at an inlet position into the feeding space, such that poultry is able to pick feed out of the feeding space,
   wherein the walls which together delimit or extend through the feeding space are at least partly provided with an abrasive surface structure for having beaks of the poultry abraded and worn as they pick feed out of the feeding space, and
   wherein the abrasive surface structure comprises a pattern of a plurality of sharp-edged line-elevations that form a relief that comprises a plurality of sharp-edged curvilinear or straight longitudinal ridges.

2. The system according to claim 1, wherein the sharp-edged line-elevations form circumferentially closed sharp-edged line-elevations, in particular rounded line-elevations like circles and ovals.

3. The system according to claim 2, wherein each circumferentially closed sharp-edged line-elevation comprises an outwardly pressed elevation with an inwardly pressed recess therein.

4. The system according to claim 2, wherein each circumferentially closed sharp-edged line-elevation forms part of a sharp-edged crater, wherein the sharp-edged line elevation is provided on a transition between a ring-shaped elevation and recess of the crater.

5. The system according to claim 4, wherein the recess is rounded, semi-spherical or cone-shaped.

6. The system according to claim 4, wherein the recess has a smooth surface.

7. The system according to claim 1, wherein the pattern of sharp-edged line-elevations has been obtained by means of a stamping or punching operation with a stamping or punching tool and a counter die.

8. The system according to claim 1, wherein the pattern of sharp-edged line-elevations forms an integral part of the walls which together delimit or extend through the feeding space.

9. The system according to claim 1, wherein the pattern of sharp-edged line-elevations is provided on one or more members which are releasably connected to the walls which together delimit or extend through the feeding space.

10. The system according to claim 1, wherein the pattern of sharp-edged line-elevations is made out of metal.

11. The system according to claim 1, further comprising:
a feeding track having at least one longitudinal trough segment with inner walls which together delimit the feeding space which at its upper side is accessible for poultry via a feeding opening;
a feed supply for supplying feed at an inlet position into the feeding track; and
a drivable conveying element which extends along the feeding track for transporting feed from the inlet position along the feeding space, such that poultry is able to pick feed out of the feeding space,
wherein walls of the conveying element and/or said inner walls of the trough segment at least partly comprise the pattern of sharp-edged line-elevations.

12. The system according to claim 11, wherein said inner walls of the trough segment comprise sloping or vertical wall sections which lead towards the conveying element, and wherein the sloping wall sections are at least partly provided with the pattern of sharp-edged line-elevations.

13. The system according to claim 11, wherein the feeding track is an endless track and the conveying element is an endless conveying element that is moveable in the longitudinal direction through the feeding track.

14. The system according to claim 1, further comprising:
a feeding device having at least one dish-shaped dispensing pan with inner walls which together delimit the feeding space which at its upper side is accessible for poultry via a feeding opening, and a feed drop tube opening out above a central part of the pan,
wherein said inner walls of the dispensing pan at least partly comprise the pattern of sharp-edged line-elevations.

15. A method for feeding poultry, comprising the steps of:
providing the system according to claim 1;
supplying feed into the feeding space; and
having the poultry pick the feed out of the feeding space while automatically having their beaks abraded and worn by the pattern of sharp-edged line-elevations that form said relief comprising said plurality of sharp-edged curvilinear or straight longitudinal ridges.

16. A poultry feeding system, comprising:
walls which together delimit a feeding space which at its upper side is accessible for poultry; and
a feed supply for supplying feed at an inlet position into the feeding space, such that poultry is able to pick feed out of the feeding space,
wherein the walls which together delimit or extend through the feeding space are at least partly provided with an abrasive surface structure for having beaks of the poultry abraded and worn as they pick feed out of the feeding space, and
wherein the abrasive surface structure comprises a pattern of a plurality of sharp-edged line-elevations,
a feeding track having at least one longitudinal trough segment with inner walls which together delimit the feeding space which at its upper side is accessible for poultry via a feeding opening;
a feed supply for supplying feed at an inlet position into the feeding track; and
a drivable conveying element which extends along the feeding track for transporting feed from the inlet position along the feeding space, such that poultry is able to pick feed out of the feeding space,
wherein walls of the conveying element and/or said inner walls of the trough segment at least partly comprise the pattern of sharp-edged line-elevations,
wherein the conveying element comprises a chain with links which are slideably carried by a bottom wall of the trough segment, and
wherein upper sides of the chain links are at least partly provided with the pattern of sharp-edged line-elevations.

* * * * *